Sept. 22, 1959  J. F. HOCH  2,905,937
INDICATOR PANEL
Filed Nov. 25, 1957

INVENTOR.
JOSEPH F. HOCH
BY
ATTORNEY.

United States Patent Office 2,905,937
Patented Sept. 22, 1959

2,905,937

INDICATOR PANEL

Joseph F. Hoch, Sierra Madre, Calif., assignor to Sierra Precision, Inc., Monrovia, Calif., a corporation of California Application November 25, 1957, Serial No. 698,858

6 Claims. (Cl. 340—366)

The invention relates to indicator panels and has particular reference to a box like panel, capable of being mounted in the cab of a truck at a location easily visible to the truck operator. The indicator panel here under consideration is one which reveals certain information by the appearance of lighted electric lamps so located that they are readily visible in broad daylight.

In the cab of the average truck or tractor used for hauling heavy loads over the highway, most of the instruments which have to do with the operation of the vehicle are mounted on the instrument panel, which is customarily a panel extending across the front of the vehicle, beneath the windshield. The instrument panel customarily is constructed of such size as to accommodate the customary type of instruments and the mounting is one of structural convenience as a rule, without special regard to the readability of the instruments under adverse conditions. Where the instrument depends upon dial readings, lights may be provided to make them visible at night, but even though lighted, the readings are not always easy to make quickly and accurately.

As safety features continue to be emphasized and as instruments for detecting the condition of certain equipment become needed to warn the operator of faulty conditions which might prove damaging, the need has increased for an indicator panel capable of being located in a most advantageous position within the range of vision of the operator and also one which cannot be misread under adverse circumstances.

It is therefore among the objectives of the invention to provide a new and improved indicator panel which is so constructed that electric lamps are lighted to indicate certain conditions present in equipment of the vehicle, the lamps being so mounted that they are clearly and easily visible to the operator under all conditions, and especially in broad daylight or sunlight.

Another object of the invention is to provide a new and improved indicator panel which is equipped with lights visible in bright daylight to such an extent that even though the lights may be mounted close to each other, they can readily indicate which of a group of lights might indicate need for special attention without the prospect of confusing one light with another.

Still another object of the invention is to provide a new and improved indicator panel which is compact in its arrangement and very simple and inexpensive in construction and which at the same time is thoroughly reliable and therefore adequate for use in indicating certain critical conditions on a vehicle, such as faulty brakes, which assures the requisite degree of reliability.

Still another object of the invention is to provide a new and improved indicator panel featuring lights visible in bright daylight for the purpose of indicating certain conditions and which is so constructed that it can be quickly and effectively dismounted and opened up to permit ready access to interior working parts, and which moreover, is so constructed that virtually a minimum amount of service time may be required in extracting and replacing light bulbs, changing switches, and generally checking and reconditioning the sundry parts.

With these and other objects in view, the invention consists in the construction, arrangement and combination of the various parts of the device, whereby the objects contemplated are obtained, as hereinafter set forth and pointed out in the appended claims and illustrated in the accompanying drawings.

Figure 1:
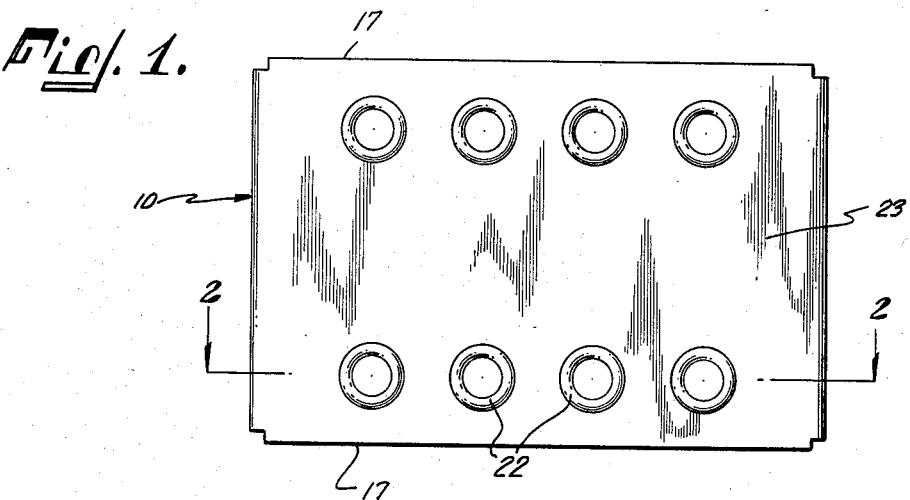
Fig. 1 is a plan view of the indicator panel.
Figure 2:
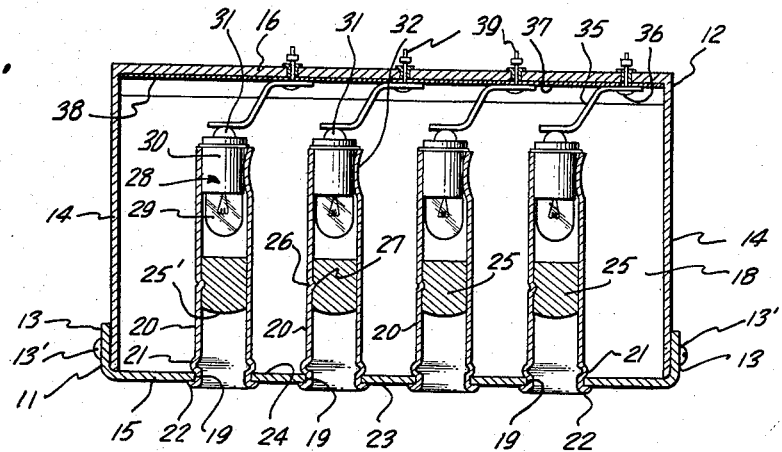
Fig. 2 is a longitudinal sectional view of the indicator panel taken on the lines 2—2 of Fig. 1.
Figure 3:
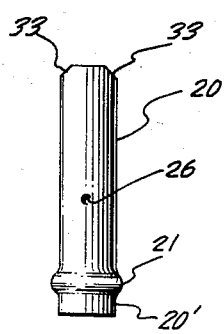
Fig. 3 is a side elevational view of one of the tubes prior to insertion into the indicator panel.

In an embodiment of the invention chosen for the purpose of illustration, there is shown a casing identified generally by the reference character 10. The casing is formed mainly by combining a front half 11 with a rear half 12. On the front half are side wall tabs 13, designed for reception and engagement with side walls 14 of the rear half 12 by conventional means such as screws 13'. The front half has a front wall 15 which with a rear wall 16, side walls 17 and the side walls 14 enclose a chamber 18. In the front wall is a series of apertures 19 which in the chosen embodiment consists of two rows of four apertures each, these being sufficient in number to accommodate four wheels of a truck and four wheels of a trailer which might be attached to and hauled by the truck. In each of the apertures 19 is mounted a tube 20 and inasmuch as the tube for each of the apertures is identical, a description of one will suffice for all. Adjacent the outer half of the tube 20 is an annular bead 21 which when the tube is assembled with the front wall 15 lies in engagement with an inner face 24 of the wall. The outer end of the tube is riveted over to form an outer annular flange 22 which overlies an outer face 23 of the front wall 15. The tube is in this manner secured to the front wall.

Within the tube is a translucent plug 25 which customarily has a red or amber color. The plug is secured in position by a dimple 26 which is forced inwardly into engagement with a recess 27 in the translucent plug 25. It will be noted that the plug is spaced approximately half way between opposite ends of the tube and has a rather substantial length. More particularly, it is important to note that an outer convex surface 25' of the plug lies well within the tube and leaves an ample portion of the tube between the outer convex face and the outermost end of the tube.

Prior to installation in the casing, the tube is provided with a cylindrical neck 20' which when assembled is inserted into the aperture 19 and which provides the necessary metal for forming the annular flange 22.

To illuminate the translucent plug 25 an electric lamp or bulb 28 is used. This lamp can be of very low intensity since it is mounted entirely within the tube and is confined between the inside wall of the tube and the translucent plug. Light from the lamp passes through the translucent plug. The lamp has a glass bulb 29 facing inwardly into the tube and a base 30. A contact button 31 protrudes outwardly beyond the adjacent end of the tube. To anchor the base in position in the tube a portion of the tube metal is deformed to form a depressed area 32 which bears somewhat resiliently against the exterior of the base.

In order to facilitate removal of the lamp or bulb for replacement, cut-outs 33 are provided on diametrically opposite sides of the tube which enable the serviceman to grip the base of the lamp with his fingers or fingernails and thus easily withdraw the lamp.

The base of the lamp is electrically grounded on the wall of the tube 20. A second contact through the contact button 31 is made with a resilient prong 35, an outermost end of which presses against the contact button 31. The prong is secured against a sheet of dielectric material 38 at the inner face 37 of the rear wall 16 by means of an insulated rivet 36 which may serve as a binding post 39.

It will be clear from the foregoing description that the indicator panel comprises a compact unit of simple design in that each of the tube assemblies is separately attached to the front half and when the halves are separated all of the tube assemblies become readily accessible. The mere separation of the rear half from the front half disconnects all of the tubes and makes possible removal of lamps and replacement without any additional separation of parts being needed. When the halves are assembled all of the contacts are made simultaneously. Tolerances can be broad because of the fact that the prongs 35 are resilient in character and so located and arranged that contact is assured even though there might be some maladjustment of the casing parts.

Moreover, by forming the casing with the depth indicated relatively long tubes can be used in the convenient method herein described and this makes possible locating the translucent plugs 25 deep in each one of the tubes. Hence the lighted plug is readily visible since it is not struck by sunlight from any angle regardless of where the unit might be located in the cab of a truck or tractor. Accordingly, a very inexpensive and at the same time dependable, simple and effective panel is provided, the operation of which can be depended upon under virtually all circumstances.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A luminous indicator device comprising a pair of front and rear casing halves releasably secured together forming a chamber, a front wall on said front half having a plurality of apertures therein, and a rear wall on said rear half, a tube for each aperture extending into the chamber to a location adjacent said rear wall and leaving a space therebetween, each of said tubes being secured to and carried by the front wall, a plug of colored translucent material in each tube intermediate the ends, and an electric light bulb for each tube having a filament facing the tube and a base substantially flush with the inner end of the tube, and means on said tube wall pressed into engagement with the base for retaining said light bulb in position.

2. A luminous indicator device comprising a pair of front and rear casing halves releasably secured together forming a chamber, a front wall on said front half having a plurality of apertures therein, and a rear wall on said rear half, a tube for each aperture extending into the chamber to a location adjacent said rear plate and leaving a space therebetween, each of said tubes being secured to and carried by the front wall, a plug of colored translucent material in each tube intermediate the ends, and at a distance inwardly from the front wall in excess of the diameter of the tube, an outer portion of said tube forming a shaded outwardly open space, and an electric light bulb for each tube having a filament facing the tube and a base substantially flush with the inner end of the tube, a portion of said tube wall being pressed into engagement with the base for retaining said light in position.

3. A luminous indicator device comprising a pair of front and rear casing halves releasably secured together forming a chamber, a front wall on said front half having a plurality of apertures therein, and a rear wall on said rear half, a tube for each aperture extending into the chamber to a location adjacent said rear wall and leaving a space therebetween, each of said tubes being secured to and carried by the front wall by attachment of inner and outer annular configurations of the metal forming the tube, a plug of colored translucent material in each tube intermediate the ends, and having an outer face thereof located inwardly from the front wall a distance not less than the diameter of the tube, an inwardly depressed bead in the wall of the tube and a complementary recess in said plug whereby the plug is releasably held in place in the tube, and an electric light bulb for each tube having a filament facing the tube and a base substantially flush with the inner end of the tube, a portion of said tube wall being pressed into engagement with the base for removably retaining said light in position whereby all the tubes, plugs and bulbs are carried as a unit by said front wall and said bulbs are held in operating position by the mounting of said front wall on said rear half.

4. A luminous indicator device comprising a pair of front and rear casing halves releasably secured together forming a chamber therebetween, a front wall of said front half having a plurality of apertures therein and a rear wall on said rear half, a tube for each aperture open at both ends, one end of each tube having outer and inner annular configurations secured to respective outer and inner sides of said front wall, a translucent plug in each tube, an electric lamp for each tube having a base thereof at the inner end of the tube and extending outwardly thereof, an area of the tube wall of said inner end being depressed into releasable base engaging position, and means forming cut-out areas at the edge of said inner end of the tube whereby to provide finger access to said base for removal of said lamp.

5. A luminous indicator device comprising a pair of front and rear casing halves releasably secured together forming a chamber therebetween, a front wall on said outer front having a plurality of apertures therein and a rear wall on said rear half, a tube for each aperture open at both ends, one end of each tube having outer and inner annular configurations secured to respective outer and inner sides of said front wall, a translucent plug in each tube, an electric lamp for each tube having a base thereof releasably secured in the inner end of the tube and extending outwardly thereof, said front wall, said tubes and the plugs and bulbs therein comprising a unit assembly, a resilient electric contact prong for each lamp anchored to said rear plate in a position of resilient engagement with an electric contact on said base, said electric contact being closed by the mounting of said unit on the rear half whereby said casing halves are mounted in assembled position.

6. A luminous indicator device comprising a pair of front and rear casing halves releasably secured together forming a chamber therebetween, a front wall plate on said front half having a plurality of apertures therein and a rear wall on said rear half, a tube for each aperture open at both ends, one end of each tube having outer and inner annular configurations secured to respective outer and inner sides of said front wall plate, a translucent cylindrical plug in each tube, the wall of said tube having a dimple therein pressed into the exterior of said plug, an electric lamp for each tube having a base thereof at the inner end of the tube and extending outwardly thereof, an area of the tube wall of said inner end being depressed into releasable base engaging position, means forming cut-out areas at the edge of said inner end of the tube whereby to provide finger access to said base for removal of said lamp, and a resilient electric contact prong for each lamp anchored to said rear wall in a position of resilient engagement with an electric contact on said base when said casing halves are in assembled position.

References Cited in the file of this patent

UNITED STATES PATENTS

| | | |
|---|---|---|
| 1,072,426 | Claflin | Sept. 9, 1913 |
| 1,640,831 | Hunt | Aug. 30, 1927 |
| 2,078,894 | Haines | Apr. 27, 1937 |